9462X
D. D. & T. Shackford,
Bread Machine,
Patented Mar. 2, 1836.
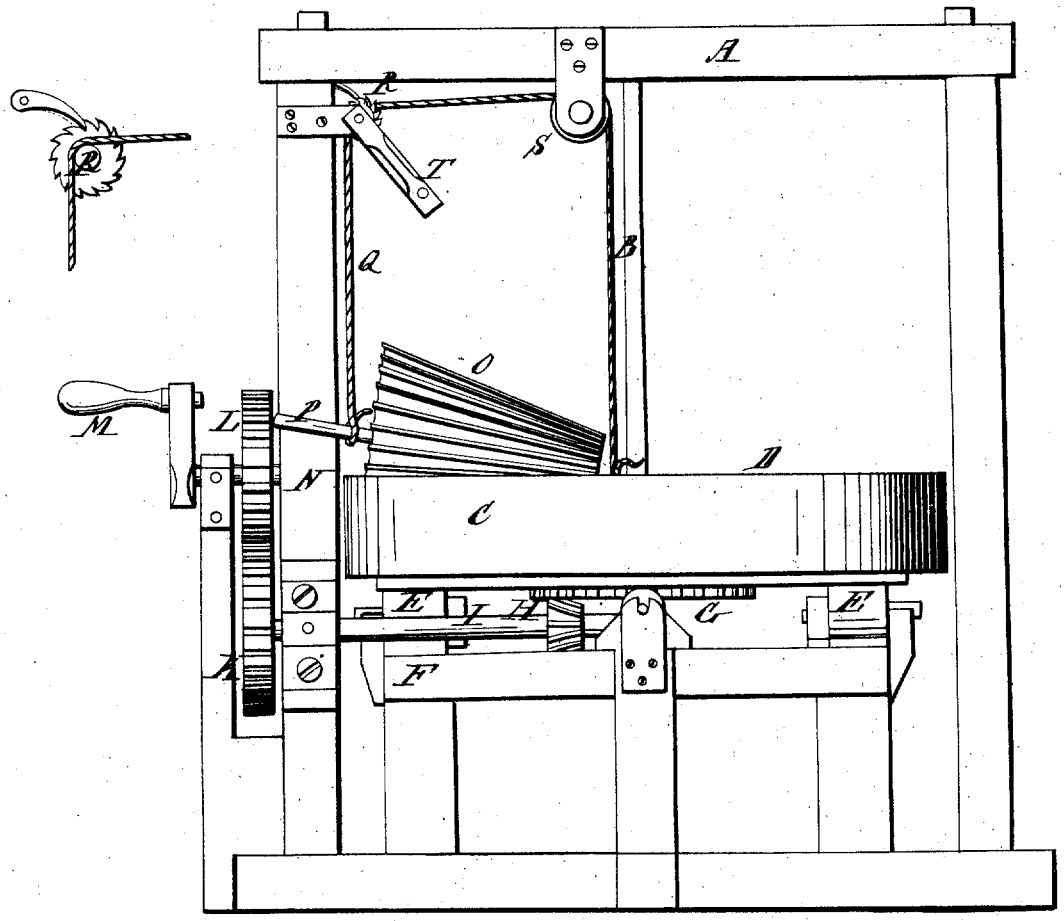

Daniel D. Shackford, & Theodore Shackford . of Westbrook
State of Maine.

Letters . Patent

The schedule referred to in these Letters Patent, and making
part of the same containing a description in the words of the said
Daniel D. Shackford & Theodore Shackford, themselves of their "im-
-provement in the machine for breaking Dough,"

Be it known that we Daniel D and Theodore Shackford
of the town of Westbrook in the county of Cumberland, and State of
Maine, have made an improvement in the useful art being
a machine for breaking Dough for bread called "Shackford's" dough
breaker" which is described as follows, reference being had to the an-
nexed drawings of the same making part of this: specification 1, A suitable frame is constructed such as is represented
at A,- in the centre of which is erected a post, B on which is
fastened and turns horizontally with it a circular platform C,
on which the dough is to be broken, having a circular rim or
curb D, around its circumference forming a trough, this plat
form, turns upon anti-friction rollers E supported in another
frame F beneath the revolving platform, motion is given to the
platform by cast iron gearings, consisting of a circular rack G.
fastened to the under side of the platform, into which works
a small vertical pinion H, fixed on the end of a horizontal
line shaft, I. having on its other end a cog wheel K. into which works
another cog wheel L whose shaft has a crank M, on its end by
which the machine is operated, this shaft and the line shaft,
being supported by the standard N. in which they turn in sui
table metallic boxes, one end of the line shaft turns in a box
in a standard on the second frame, --

In the circular trough and revolving in it, is placed a flu
-ted frustrum of a cone O, for breaking the dough. having an axle
P passing through its centre, by which the cone is suspended from the ends of a chain or rope Q passing over a shaft R and over a pulley S, the shaft R having a crank handle T, on one end by which it is turned in order to raise or lower the cone, a cog wheel & pall being fixed on the other end of this shaft, to secure it in any required position, one end of the axle P, has an eye passing over the centre post to allow it to work up and down on the same, The dough being first prepared for the breaking in the trough is placed upon the revolving platform - the crank handle is turned, this turns the cog wheels on its shaft which turns the cog wheel on the end of the line shaft and with it the line shaft, and pinion on its other end which works in the circular rack, fastened to the under side of the circular platform, and thus turns it with the dough thereon in a horizontal position, the dough passing under the fluted cone or breaker, which at the same time has a rotary motion, its axle being suspended in the ends of the chain or rope and bearing horizontally against the centre post, and against one of the side posts of the frame, This operation is continued till the dough be sufficiently broken, The machine may be operated by Manual, Horse, water or other power,

What we claim as a new and as of our invention and which we desire to secure by Letters Patent, consists in the combination and arrangement of the several parts of the before described machine for breaking dough.

Witnesses
Edwin Pearson
David Hayes

Daniel D. Shackford
Theodore Shackford

6th
MGl.

Drawing

[illegible]